Patented Sept. 30, 1930

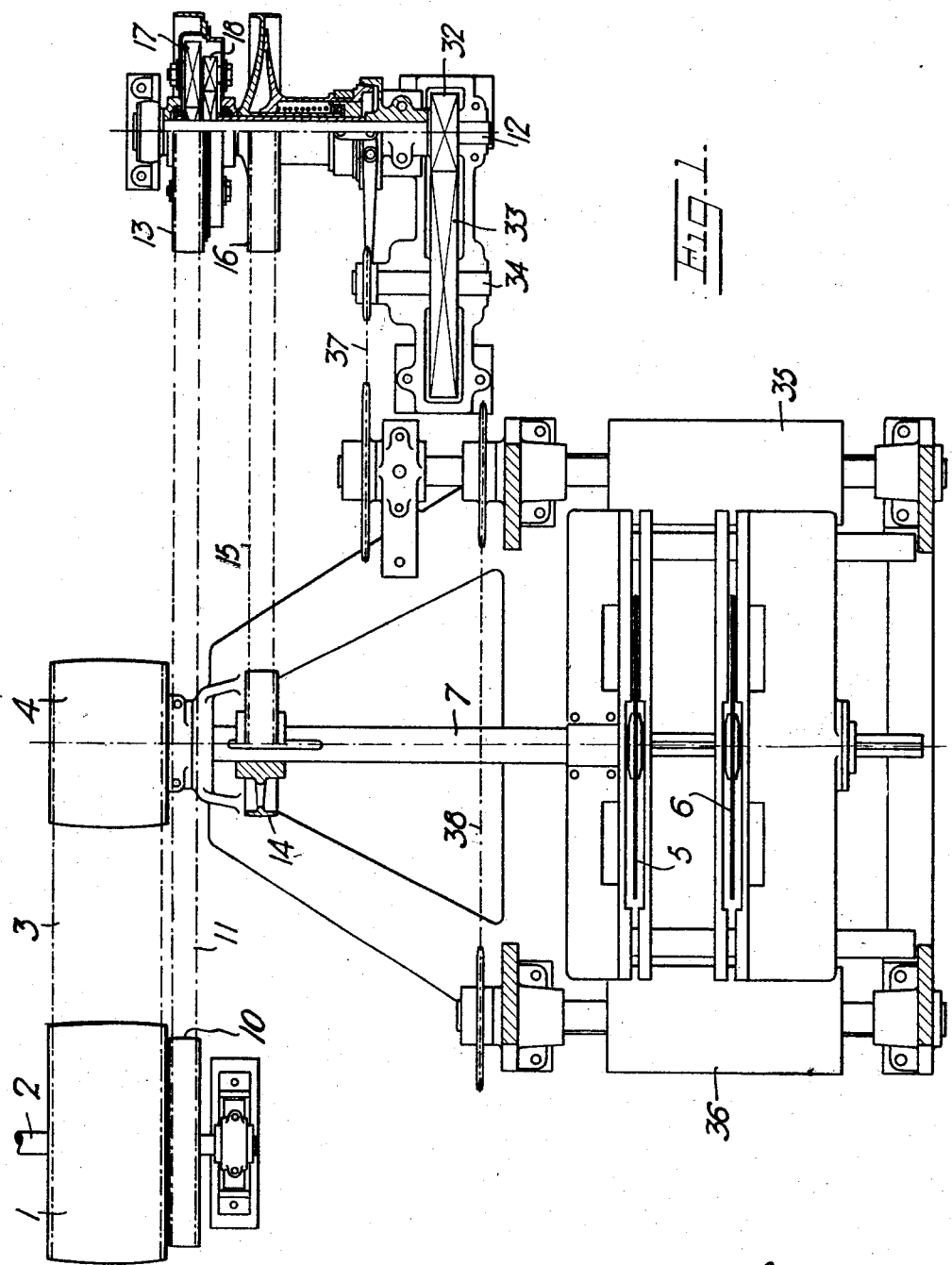

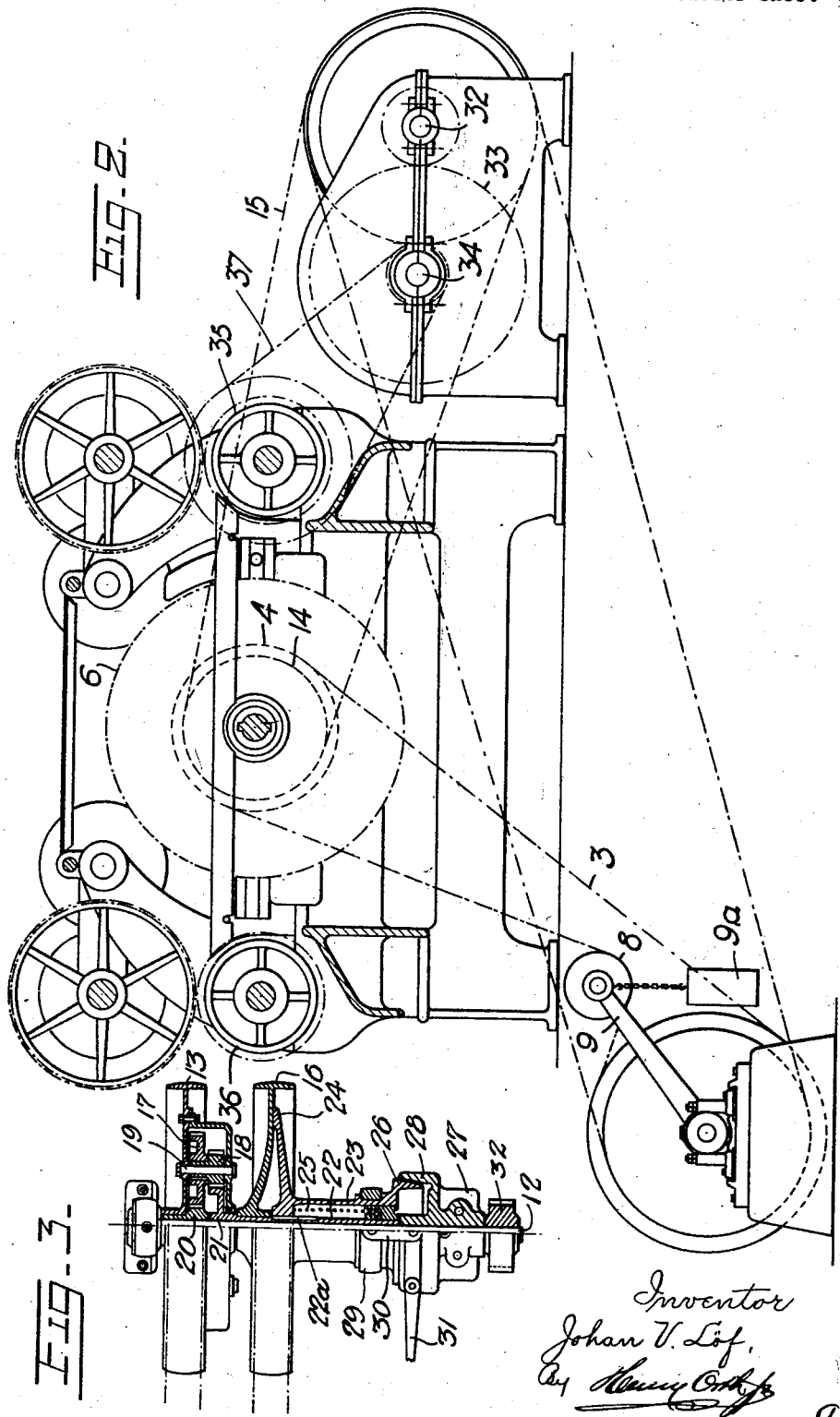

1,776,976

UNITED STATES PATENT OFFICE

JOHAN VILHELM LÖF, OF STOCKHOLM, SWEDEN

MACHINE TOOL

Application filed February 15, 1929, Serial No. 340,232, and in Sweden February 15, 1928.

In machine tools, especially wood working machines, such as sawing machines, in which the resistance to the tool varies because of the different structure of the wood, various rates of feed in accordance with the resistance to the tool are required to utilize the full capacity of the machine while avoiding overload on the tool. Such changes of the feed have heretobefore generally been made by hand and the production of the machine has, therefore, depended very much upon the attention of the machine operator and his skillfulness in estimating the structure of the wood, as not only the thickness of the wood but also its structure (branch knots, gnarly and twisted wood etc.) has influence upon the resistance met by the tool. Lack of attention to said circumstances thus causes a bad utilization of the capacity of the machine or an overload on the tool.

The object of this invention is to remove the said inconveniences by making the rate of feed automatically dependent on the resistance set to the tool in the operation of the machine. The invention consists, chiefly, in the provision, in such machines, of a driven tool shaft, a main shaft driven independently at a constant speed, an intermediate shaft, a feed device for the work, a transmission between said intermediate shaft and the feed device, and a differential gearing between said tool shaft, said main shaft, and said intermediate shaft to drive said intermediate shaft from both said main shaft and said tool shaft.

In the annexed drawings an edger or a saw for edging purposes having a feeding device according to the invention is shown.

Fig. 1 shows a plan of the saw partly in section. Fig. 2 shows a partly sectional elevation thereof, and Fig. 3 shows an elevation of the driving gear of the feed device, half in section.

Referring now to the drawings 1 indicates a pulley secured to a main or driving shaft 2, 3 a driving belt and 4 a driven pulley on the tool shaft 7 carrying the saw blades 5, 6 of the edger. The belt 3 is provided with a belt stretcher consisting of a roller 8 carried by a rotatable arm 9 which is loaded by a weight 9ª in such manner that it can yield in the case of an overload on the saws to permit a slip of the belt 3.

On the main shaft 2 a second pulley 10 is secured—which if desired may be integral with the pulley 1—and by a belt 11 is connected to a pulley 13 loosely rotating on an intermediate shaft 12. On the tool shaft 7 of the machine an additional pulley 14 is provided connected by means of a belt 15 to a second pulley 16 on the shaft 12. The ratio of gearing to the pulleys 13 and 16 is selected in such manner that said pulleys are driving at one and the same speed when the belt 3 works without slip.

The pulley 13 forms a cover for a planet gearing and supports the shaft bolts 19 of the planet wheels 17, 18, said wheels being rigidly secured to each other. The planet gear comprises further two central or sun wheels 20, 21. The wheel 20 is keyed on the intermediate shaft 12 and engages the planet wheel 17 while the wheel 21 is secured to or is integral with a sleeve 22 freely rotatable on the intermediate shaft 12 and engages the planet wheel 18. The pulley 16 is freely rotatable on the sleeve 22 and constitutes one of the halves of a friction clutch coupling. The other half of said coupling consists of a socket-shaped part 23 which is axially slidable on the sleeve 22 and prevented from rotating thereon by a key 22ª. The socket 23 has a disc-shaped portion facing the pulley 16 and having a friction ring 24 which is normally pressed against a corresponding friction surface on the pulley 16 by means of a spring 25 provided in said socket 23 in such manner that the socket is coupled to said pulley. The other end of the socket 23 is formed to a friction cone 26 which can be called to engage a corresponding friction surface on a ring 28 secured to the bearing 27 when said socket is moved against the action of the spring 25. The operation of said socket 23 to disconnect it from the pulley 16 and to lock it to the ring 28 is performed by means of a ring 29 engaging said socket as well as a link 30 and a lever 31.

On the intermediate shaft 12 a toothed wheel 32 is secured engaging a toothed wheel 33 on a counter shaft 34 which is connected with the rollers 35, 36 of the edger by means of chain drives 37, 38 or the like.

The device described operates as follows: When the friction ring 24 engages the pulley 16 and the belt 3 drives the tool shaft 7 of the edger without slip both of the pulleys 13 and 16 are driven at the same speed and, thus, the toothed wheels of the planet gearing are locked in a fixed position in relation to each other and the toothed wheel 20 as well as the intermediate shaft 12 have the same number of revolutions as the pulleys 13, 16. The feed rollers of the edger are then driven at a maximum speed permitting the utilization of the entire capacity of the edger.

If the resistance which the saw blades 5, 6 have to overcome is for any reason increased to such an extent that the belt 3 slips on the pulley 4 the pulley 16 driven by the belt 15 from the tool shaft 7 will rotate at a lower number of revolutions than that of the pulley 13 thus causing the planet gear to operate in such manner that the intermediate shaft 12 is driven at a lower speed than before. The ratio of gearing is, preferably, so chosen that a slight decrease of the speed of the tool shaft 7 because of the slip of the belt 3 causes a rather great decrease of the speed of the intermediate shaft 12 so that the feed is reduced and the load on the saw blades rapidly reduced to a safe value.

If the socket 23 is withdrawn so far that the ring 24 is out of contact with the pulley 16, but no engagement between the parts 26 and 28 is brought about the pulley 16 and the sleeve 22 can rotate freely and thus no motion is transmitted to the intermediate shaft 12 and the feed rollers 35, 36. If the socket 23 is withdrawn still more the cone 26 engages the ring 28 and said socket 23 as well as the sleeve 22 and the toothed wheel 21 are locked to the stationary bearing 27 while the pulley 16 still is free to rotate. When the pulley 13 rotates the planet wheel 18 rolls on the wheel 21 which now is held stationary and transmits motion to the intermediate shaft 12 through the planet wheel 17 and the sun wheel 20, the feed now taking place in the opposite direction so that the work piece is fed backwards away from the saw blades.

By use of the invention described above the advantage is attained that the working tool, for instance the saw blades of an edger, are effectively protected against overload, independent of the attention and skilfulness of the operator. Further the advantage is attained that always an optimum ratio of feed is automatically obtained in accordance with the structure of the wood or other material being worked and, in addition, the feed may be applied successively and be stopped and reversed easily and quickly.

The invention is not limited to the embodiment shown in the drawings inasmuch as the constructional elements thereof can be varied according to the circumstances. Thus, for instance, instead of the belt 3 a friction clutch coupling permitting a slip in the case of an overload of the working tool may be provided in the transmission to the tool shaft 7.

What I claim is:—

1. In a machine tool, a driven tool shaft, a main shaft driven independently at a constant speed, an intermediate shaft, a feed device for the work, a transmission between said intermediate shaft and the feed device and a differential gearing between said tool shaft, said main shaft, and said intermediate shaft to drive said intermediate shaft from both said main shaft and said tool shaft.

2. In a machine tool, a driven tool shaft, a main shaft driven independently at a constant speed, an intermediate shaft, a feed device for the work, a transmission between said intermediate shaft and the feed device, two pulleys on said intermediate shaft, one of said two pulleys being driven from said tool shaft and the other pulley from said main shaft, and a differential gearing between said pulleys and said intermediate shaft to drive said intermediate shaft from both said main shaft and said tool shaft.

3. In a machine tool, a driven shaft, a main shaft driven independently at a constant speed, an intermediate shaft, a feed device for the work, a transmission between said intermediate shaft and the feed device, a differential gearing between said tool shaft, said main shaft, and said intermediate shaft to drive said intermediate shaft from both said main shaft and said tool shaft, and a clutch coupling between one driving element of said differential gearing and the driving shaft of said element.

4. In a machine tool, a driven tool shaft, a main shaft driven independently at a constant speed, an intermediate shaft, a feed device for the work, a transmission between said intermediate shaft and the feed device, a differential gearing between said tool shaft, said main shaft, and said intermediate shaft to drive said intermediate shaft from both said main shaft and said tool shaft, a clutch coupling between one driving element of said differential gearing and the driving shaft of said element, and means for locking said driving element in a stationary position to reverse said differential gear.

5. In a machine tool, a tool shaft, a main shaft driven independently at a constant speed, between said main shaft and said tool shaft a transmission capable of slipping at an overload on said tool shaft, an intermediate shaft, a feed device for the work, a transmission between said intermediate shaft and the feed device, and a differential gearing between said tool shaft, said main shaft, and said intermediate shaft to drive said intermediate shaft from both said main shaft and said tool shaft.

6. In a machine tool, a tool shaft, a main shaft driven independently at a constant speed, between said main shaft and said tool shaft a transmission capable of slipping in the case of an overload on said tool shaft, an intermediate shaft, a feed device for the work, a transmission between said intermediate shaft and said feed device, two pulleys on said intermediate shaft, one of said two pulleys being driven from said tool shaft and the other pulley from said main shaft, differential gearing between said pulleys and said intermediate shaft to drive said intermediate shaft from both said main shaft and said tool shaft, a clutch coupling between one driving element of said differential gearing and the driving pulley of said element, and means for locking said driving element in a stationary position to reverse said differential gearing.

In testimony whereof I have signed my name.

JOHAN VILHELM LÖF.